United States Patent [19]

Witschi et al.

[11] 4,169,371

[45] Oct. 2, 1979

[54] METHOD AND APPARATUS FOR MEASURING DRIVE SYSTEM CHARACTERISTIC DATA IN DYNAMIC OPERATION

[76] Inventors: Ernst Witschi, Gloriastrasse 35, Zürich, Switzerland, CH-8006; Walter Rüegg, Sandackerstrasse 537, Endingen, Switzerland, CH-5304

[21] Appl. No.: 823,050

[22] Filed: Aug. 8, 1977

[51] Int. Cl.² .................................................. G01M 15/00
[52] U.S. Cl. .................................. 73/116; 73/133 R; 364/431
[58] Field of Search ............. 73/116, 133 R; 364/431

[56] References Cited

U.S. PATENT DOCUMENTS

| | | |
|---|---|---|
| 3,516,287 | 6/1970 | Masuda et al. .................... 73/117 |
| 3,554,022 | 1/1971 | Geal .................................. 73/117 |
| 3,581,561 | 6/1971 | Tomashek et al. ............. 73/133 UX |
| 3,657,922 | 4/1972 | Sibeud .............................. 73/117.3 |
| 3,722,265 | 3/1973 | Metz et al. .................... 73/133 R X |
| 3,729,989 | 5/1973 | Little .............................. 73/133 R |
| 3,817,092 | 6/1974 | Ludloff ........................... 73/116 X |
| 3,853,002 | 12/1974 | Peck ................................ 73/116 X |
| 3,942,112 | 3/1976 | Westbrook ..................... 324/175 X |
| 3,955,135 | 5/1976 | Fastaia ........................... 73/117.3 X |

FOREIGN PATENT DOCUMENTS

| | | |
|---|---|---|
| 1012484 | 12/1957 | Fed. Rep. of Germany . |
| 1124278 | 2/1962 | Fed. Rep. of Germany . |
| 1938824 | 8/1973 | Fed. Rep. of Germany . |
| 321328 | 11/1929 | United Kingdom . |
| 666989 | 2/1952 | United Kingdom . |
| 854188 | 11/1960 | United Kingdom . |
| 1042157 | 9/1966 | United Kingdom . |
| 1304223 | 1/1973 | United Kingdom . |
| 1348122 | 3/1974 | United Kingdom . |
| 1349713 | 4/1974 | United Kingdom . |

*Primary Examiner*—Jerry W. Myracle
*Attorney, Agent, or Firm*—Peter K. Kontler

[57] ABSTRACT

The torque and/or power of a drive system in dynamic operation is ascertained by generating first signals which are at least proportional to the speed of the drive system, automatically differentiating the first signals to obtain second signals which are at least proportional to acceleration of the system, and automatically multiplying the first and second signals to generate third signals whose magnitude is at least proportional to the power and/or torque of the drive system.

32 Claims, 2 Drawing Figures

METHOD AND APPARATUS FOR MEASURING DRIVE SYSTEM CHARACTERISTIC DATA IN DYNAMIC OPERATION

The present invention relates to a method of measuring the characteristic data of drive systems in dynamic operation, and in particular power, torque and efficiency, and to an apparatus for carrying out the method.

All conventional methods of determining power and torque of drive systems of all kinds operate basically on the same principle. The drive system is braked or loaded by means of a braking device, for example an eddy current brake or a water brake and the thus generated torque M is measured. The power L is determined on the basis of the mathematical interrelationship according to which the power is equal to the product of the momentum (torque) and the angular velocity.

The torque thus has to be directly measured. In the case of particularly high power and high rotational speeds, this involves very complex techniques and equipment. Since, in addition, the measurement is conducted at constant angular velocity, there is the further disadvantage of relatively long preparation and measurement times, especially when it is desired to determine the entire torque or power curve as a function of the rotational speed. If the process is automated, very complex and expensive regulation or control systems are required. Dynamic effects, which are produced in the case of rapid acceleration of combustion engines, an operating condition which is very frequent in practice, particularly with combustion engines, cannot be investigated by resorting to conventional techniques.

Further serious problems arise in connection with the measurement of power and torque of an engine which is installed, e.g., in a motor vehicle, without removing the engine.

The conventional method involves the use of roller-torque stands. The use of built-in torque-measurement shafts or of a brake dynamometer which is directly coupled to the driving mechanism is only rarely applicable.

When using a roller-torque stand, the engine power is transmitted via the entire driving mechanism to the tires and therefrom to the rollers. The power consumption of the rollers is measured by way of water brakes or eddy current brakes.

A serious disadvantage of this method is that only the power consumption of the rollers is measured, which is the power transmitted from the wheels of the vehicle to the rollers. This power is not equal to the power which would be transmitted, under identical operating conditions, from the car wheels to a road because deformation energy of the tires and power losses due to slip are not equal in both situations. Furthermore, the power which is measured by means of a roller-torque stand does not correspond to the actual engine power which would have to be measured on the engine side of the clutch. The losses in the power transmission from the clutch via gear box, differential drive and tires reduce the measured power by an amount which approximates ⅓ of the actual engine power. Therefore, the roller-torque stand method provides only relative results and is not convenient to provide results indicative of the exact actual engine power. Although some conventional roller-torque stands provide the possibility of determining the power losses by measuring the transmitted power to the rollers after the engine has been decoupled from the wheels, this does not ppreciably improve the method because the losses, when power is transmitted, are not equal to those during idling.

A further disadvantage of such roller-stands is that the tires are subjected to very high stresses which often results in damage and necessitates the provision of additional cooling systems replacing the cooling air stream at normal driving.

SUMMARY OF THE INVENTION

For eliminating the above mentioned disadvantages, there is provided a novel method of measuring drive system characteristic data in dynamic operation, especially power, torque and efficiency, wherein at least one kinematical value is measured and the desired characteristic data are determined from it.

The invention also resides in the provision of an apparatus for measuring drive system characteristic data in dynamic operation. The apparatus comprises means for measuring a kinematical value, and evaluation means for determining the desired characteristic data.

To permit a better understanding of the invention, the relevant physical equations will first be listed.

The instantaneous power $L(t)$ equals the product of instantaneous torque $M(t)$ and instantaneous angular velocity $\omega(t)$:

$$L(t) = M(t) \cdot \omega(t) \tag{1}$$

In the case of an accelerated system:

$$(dD(t)/dt) = M(t), \tag{2}$$

where D is the angular momentum.
Also:

$$D(t) = \theta \cdot \omega(t), \tag{3}$$

where $\theta$ = moment of inertia.
If (3) is inserted into (2), then the following is obtained:

$$\frac{d(\theta \cdot \omega(t))}{dt} = M(t) \tag{4}$$

If the moment of inertia $\theta$ remains constant with respect to time during measurement, which is the case in practical applications, then formula (4) can also be written as follows:

$$\theta \cdot \frac{d\omega(t)}{dt} = M(t) \text{ or} \tag{5}$$

$$\theta \cdot \beta(t) = M(t) \text{ where } (\beta(t)) = \text{angular acceleration.} \tag{6}$$

Thus, when the moment of inertia $\theta$ is known, the instantaneous torque $M(t)$ can be ascertained by determining the purely kinematical value $\omega(t)$ or $\beta(t)$.

If formula (5) or (6) is inserted into (1), then for the instantaneous power, the following is obtained:

$$L(t) = \theta \cdot \frac{d\omega(t)}{dt} \cdot \omega(t) = \theta \cdot \beta(t) \cdot \omega(t) \tag{7}$$

Of course, in the above formulae, the values $\omega(t)$ and $\beta(t)$ can be expressed in terms of kinematical values, e.g.:

velocity and radius r: $\omega(t) = v(t)/r$ acceleration a(t): $\beta(t) = a(t)/r$, $\omega(t) = \int \beta(t) dt$ distance s(t): $\omega(t) = \dfrac{da(t)/r}{dt}$ Angle $\phi(t)$: $\omega(t) = \dfrac{d\phi(t)}{dt}$ (8)

Period T(t)

(or fractions thereof): $\omega(t) = \dfrac{2 \cdot \pi}{T(t)}$

Revolutions: n(t): $\omega(t) = 2 \cdot \pi \cdot n(t)$ and other values which can be derived by mathematical operations from the above values.

As can be seen from formula (7) and formulae (8), it is also possible to determine the power or the torque values of a motor merely by measuring a single kinematic value, e.g. $\omega(t)$. The measurement of the torque or of work is not necessary.

If, during a measurement, the moment of inertia $\theta$ is altered, (e.g., in order to simulate a changing load), then instead of formula (5) or (6) the following results:

$$M(t) = \theta(t) \cdot \dfrac{d\omega(t)}{dt} + \omega(t) \cdot \dfrac{d\theta(t)}{dt} \text{ or} \quad (9)$$

$$M(t) = \theta(t) \cdot \beta(t) + \omega(t) \cdot \dfrac{d\theta(t)}{dt}$$

and the following equation is obtained for the power:

$$L(t) = \theta(t) \cdot \dfrac{d\omega(t)}{dt} \cdot \omega(t) + \omega^2(t) \cdot \dfrac{d\theta(t)}{dt} \quad (10)$$

or transformations with $$\beta(t) = \dfrac{d\omega(t)}{dt}$$

and all formulae (8).

If, instead of rotating, the load performs a translatory movement, e.g., a motor vehicle itself as the load on its own motor, which of course is the "most genuine" of all possible loads, then the following formulae apply:

$$L(t) = F(t) \cdot v(t), \quad (F(t) = \text{drive force}) \quad (11)$$

$$\dfrac{d(m \cdot v(t))}{dt} = F(t) \quad (12)$$

or in the case of a mass m constant in respect of time:

$$m \cdot \dfrac{dv(t)}{dt} = F(t), \text{ inserted into (11):} \quad (13)$$

$$L(t) = M \cdot \dfrac{dv(t)}{dt} \cdot v(t) = m \cdot a(t) \cdot v(t) \quad (14)$$

This means that, when the mass m of the load is known, it is possible, merely by measuring the velocity v(t) and/or the acceleration a(t), to determine the instantaneous acceleration power given to the load without determining the tractive resistance of the engine. To determine v(t), it is of course also possible to measure $\omega(t)$ of any rotating part of the load or of the engine or any value according to the formulae (8). After these theoretical considerations, embodiments of the improved apparatus will be described by way of example with reference to the accompanying drawings.

DESCRIPTION OF THE PREFERRED EMBODIMENTS

Figure 1:
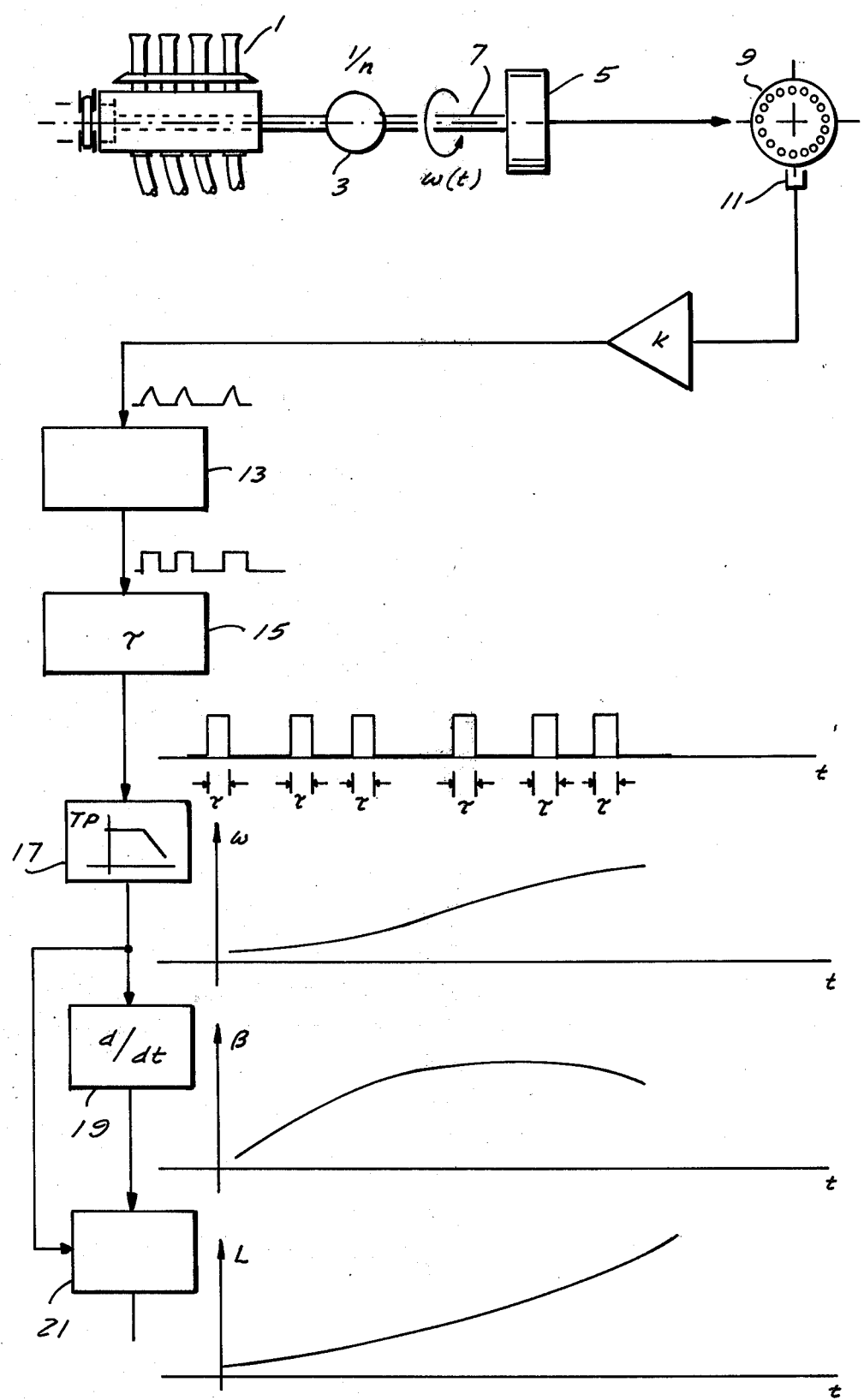
FIG. 1 is a schematic diagram of a system for determining the instantaneous power in a test-stand situation of a removed engine.

According to FIG. 1, an engine 1 to be tested accelerates a gyrating load 5 with a known moment of inertia via a transmission 3. The transmission 3 can be omitted in certain applications. A perforated disc 9 with equidistantly arranged holes is fixedly secured to a shaft 7 of the gyrating load. An optical-electric sensing fork 11 converts optical pulses, which are generated as a result of orbiting of holes on the perforated disc, into electrical pulses of uniform frequency if the RPM of the engine is constant.

A Schmitt trigger 13, to which these electrical impulses are transmitted, and a monoflop 15 connected to it, standardize the impulses to a fixed pulse width and pulse amplitude, whereby the repetition frequency of the pulses is proportional to the RPM and angular speed of the gyrating mass. A low pass filter 17 forms electronically the mean values of the impulse sequence corresponding to the DC-component of the respective Fourier transformation. Its direct voltage output signal is thus proportional to the impulse repetition frequency and, therefore, to the angular velocity $\omega$ of mass 5. This direct voltage signal is transmitted to a differentiation unit 19 whose output signal is, therefore, proportional to the angular acceleration $\beta$. This output signal, when multiplied by a constant calibration factor, is equal to the torque M(t) of the drive system. In a further function block 21, the product of the signal proportional to $\omega$ and the signal proportional to $\beta$ is formed, and from it a signal is obtained which is proportional to the power L(t) which the motor transmits to the gyrating mass.

By means of a XY-recorder (not shown), to the X-input of which for example the signal proportional to $\omega$ is fed and to the Y-input of which the signal proportional to $\beta$ is fed, when the gyrating mass undergoes acceleration, the torque or power characteristic of the motor is obtained as a function of the revolutions. With a relatively small gyrating mass having a moment of inertia of, for example, 1 kg m², with a combustion engine of approximately 100 HP, in the usable revolution range, acceleration times and accordingly measurement times of typically 5 seconds are obtained. With other gyrating masses especially with no gyrating mass and/or with a transmission, practically any acceleration times can be set. Relatively long acceleration times are desirable when, simultaneously and in addition to the pure measurement of power or torque, other relatively slowly changing values such as fuel consumption or the temperature curve at various points in the system are to be measured. By using a multi-channel recorder, it is possible to record all other measurement values in so far as they are electrically measurable, at the same time as the power or torque curve as a function of revolutions.

Other kinematical values, such as the velocity of translatory movement, can be measured by the aforedescribed method. In order to carry out the necessary recalculation steps to ascertain the desired characteristic values, the electronic evaluation system is set up accordingly.

By means of suitable calibration, it is possible to measure the absolute values of characteristic data. If only comparative measurements are to be made, precise calibration is unnecessary.

The present method is capable of providing significantly shorter times for the measurement of dynamic behavior than heretofore known methods, and for the first time provides the possibility of studying dynamic phenomena under different loads during the acceleration phase in the original time scale. The apparatus of the present invention is very simple, at least from the mechanical side and is, therefore, very reliable and accurate. This is achieved by measuring a purely kinematical value, e.g., the revolutions, which is simpler and thus more precise than measuring a dynamic value, e.g. the torque. The absolute accuracy of the method described is very high, and with the above described embodiment values with an accuracy of better than 99% have been obtained, with reproducibility being significantly more accurate. The power which can be determined by this method corresponds to the actual power transmitted to an external load, i.e., less the power loss in the engine itself. If, for purposes of comparison, it is desired to determine the brake horse power $L_B(t)$ in the manner in which this is carried out in the conventional stationary braking test benches, then with the method described it is sufficient to take into account the moment of inertia of the whole system, i.e., of the load and engine, instead of just that of the load, which merely corresponds to an alteration of the calibration factor. This is expressed in the following formula:

$$L_B(t) = (\theta_s + \theta_m) \cdot \beta(t) \cdot \omega(t), \text{ or } M(t) = (\theta_s + \theta_m) \cdot \beta(t) \quad (15)$$

in which $\theta_s$ represents the moment of inertia of the load and $\theta_m$ represents that of the engine. Since the moment of inertia of the load is generally much higher than that of the engine except if no additional load is externally mounted, one only needs to know approximately the moment of inertia of the engine, or when a lower degree of accuracy is required, to ignore it. The moment of inertia of the engine can either be estimated mathematically, or can be determined from two measurements with two different known gyrating masses or two different transmission ratios using the method described. It should be noted at this point that, for maximum accuracy, the purely digital processing of the measurement values is appropriate, whereas for lower accuracy requirements, systems which work in a fully analog manner are conceivable. A good balance of effort and accuracy can be obtained by working with a mixed digital-analog system.

Although the described method provides good results when the engine can be tested on a test-bench under various loading conditions, it has some disadvantages.

The width of the impulses generated by the opto-electrical transducer 9/11 of FIG. 1 varies with rotational speed $\omega(t)$.

Figure 2:
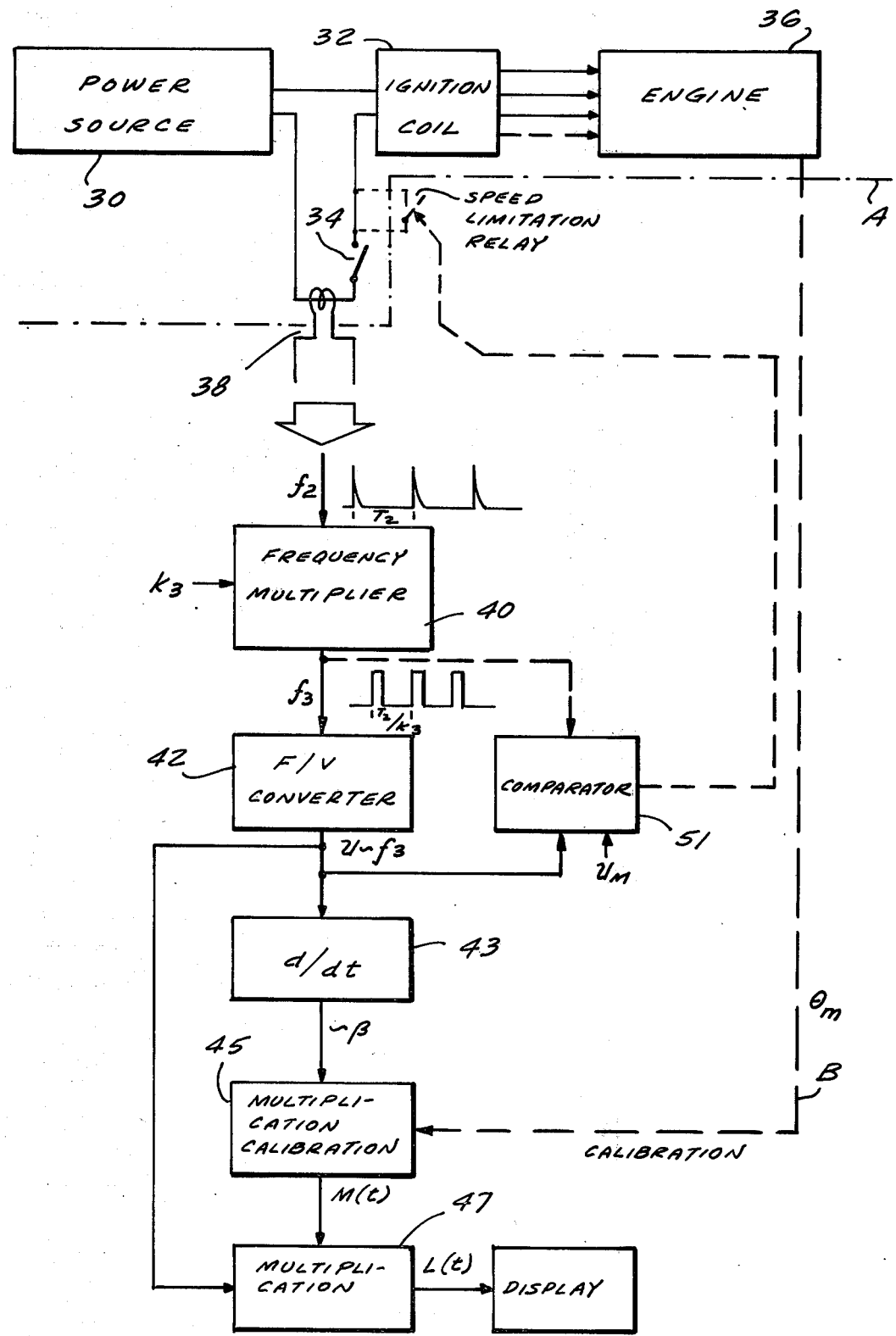
FIG. 2 is a signal flow diagram of a system for determining the instantaneous power of an unremoved engine which is in the process of being accelerated in unloaded condition.

An apparatus which needs no coding disc, and evaluates information regarding the rotational engine speed of the engine itself is shown in FIG. 2.

This apparatus is especially adapted to dynamically record power, torque and efficiency of an engine unremoved from a system actually to be driven by it, whereas the measuring time for a complete record of characteristic values is determined by the acceleration speed of the unloaded engine, which is decoupled from the power transmission system, or of the engine when only internally loaded by the transmission system e.g. if the system is not detachable from the engine.

Conventionally, an electric power source circuit, e.g., a battery, is connected to an ignition coil 32 of a combustion engine. An interrupter 34 provides by switching the ignition coil 32 on and off high-voltage impulses at its secondary side and such impulses are fed to the spark plugs of an engine 36. These parts belong to a conventional combustion engine system and are shown above the phantom line A.

Without removing the engine the current impulses e.g., at the primary side of the ignition coil are sensed by an externally applied sensor 38. This sensor can comprise a current transformer with tongs which are passed over the lead connecting the power source 30 to the ignition coil 32.

The impulses sensed by the sensor 38 have a width which is practically independent of the RPM of the engine as their form is determined only by the time constant of the ignition coil circuit. At all speeds of an engine, these impulses will clearly be separated and so detectable.

The pulse repetition period $T_2$, respectively the frequency $f_2$, is dependent on the revolution speed $\omega(t)$ of the engine $$T_2(t) = k_2 \cdot \frac{2\pi}{\omega(t)}$$

where $k_2$ is a constant and considers the engine type under test.

The instantaneous pulse repetition frequency is $$f_2(t) = \omega(t) \cdot \frac{k_2}{2\pi}$$

As during one revolution only a few ignition pulses will occur, the repetition frequency may be multiplied in a frequency multiplier unit 40 by a constant factor $k_3$ which can be selected according to the value of the engine specific constant $k_2$. The output pulses with the repetition frequency $$f_3(t) = i \, K_3 \cdot f_2(t)$$

are transmitted to a frequency-voltage converter 42 which provides at its output a voltage U proportional to $f_3$ and so still proportional to $f_2(t)$ and $\omega(t)$.

In analogy to the apparatus shown in FIG. 1, the output signal of the F/V-converter 42 is transmitted to a differentiation unit 43 to determine the value $$\beta = K_3 \cdot \frac{df_2}{dt} \sim \frac{dU}{dt}$$

The output of the differentiation unit 43 is connected to a multiplication unit 45 which provides an output signal proportional to the engine torque M(t). In this multiplication unit 45, $\beta$ is multiplied with a calibration constant which preferably represents the moment of inertia $\theta_m$ of the engine as shown by connection B, if said value is known by previous measurements. Then the output signal of said multiplication unit 45 will exactly represent the engine torque M(t).

The output of the first multiplication unit 45 is connected to one input of a second multiplication unit 47, the second input of which is connected to the output of the frequency voltage converter 42.

According to the here performed multiplication of the voltage proportional to the RPM of the engine and its torque, this multiplication unit 47 will provide an output signal proportional or, after appropriate calibration, equal to the engine power L(t).

Although the acceleration speed of an unloaded engine is often less than 1 second and it appeared to be very doubtful whether significant dynamic measurements could be performed especially at higher speeds because of dynamic effects of the engine (e.g, fuel mixture variations or thermodynamic effects), very accurate results were obtained with the described apparatus. The results did in fact correspond to the values which were measured by statical methods. The acceleration times of the engine were less than 1 second. As the unloaded engine can easily be accelerated to overspeed, a comparator unit 51 should be provided to compare either the output signal U of the frequency voltage converter 42 (this signal which is proportional to the rotational speed) with a threshold value $U_M$ which corresponds to a maximum speed to be reached or which compares a frequency (e.g., $f_3$) proportional to the rotational speed with a frequency threshold, and which when said threshold value is reached, will interrupt the ignition circuit of the engine to prevent further acceleration. For this purpose, it may be necessary to introduce a supplemental relay into the ignition circuit of the engine.

This apparatus combines the following advantages:

The characteristic values can be dynamically measured without removing an engine out of e.g., a vehicle.

No additional mechanical apparatus as brakes, rolls, gyrating masses or shafts have to be provided.

As only the ignition input frequency is evaluated, the apparatus can be produced at a very low cost.

Since the engine need not be removed, the measurement need not be performed in garages or other places with special installations.

No additional losses due to the power transmission system, will adversely influence the results.

No additional parts of the vehicle are abused besides the engine.

Measuring time is shorter than 1 second which renders it possible to employ less expensive cooling systems and noise insulations.

The output signals of the apparatus can be fed to fast XY plotters or to fast analog-digital converters for further processing.

It is also obvious that the apparatus according to FIG. 2 can be used for testing an engine on a test bench in combination with an opto-electrical transducer as shown in FIG. 1. Especially if the power required for the apparatus according to FIG. 2 is taken from the power supply of the engine itself, complete independency from other power supplies is achieved and the characteristic data can be measured anywhere e.g., on a race track.

The functional blocks of FIG. 2 were realized with the following conventional electronic components:

| | |
|---|---|
| MC 14013 | |
| MC 14027 | |
| MC 14508 | |
| MC 14510 | |
| MC 14511 | Motorola |
| MC 14518 | |
| MC 14522 | |
| MC 14526 | |
| MC 14528 | |
| MC 14585 | |

Multiplier: Intersil 8013 AC
F/V-converter: Teledyne-Philbrick 4207
PMI OP 05

The apparatus of FIG. 1 can also be used without any modifications for testing diesel engines or electric motors, generally speaking of any driving systems. The apparatus of FIG. 2 has to be altered for this purpose in such a way that information other than ignition pulses can be obtained for determination of the rotational speed. For example, one can monitor the fuel injection or vibrations of diesel engines.

The calculation of characteristic values can be performed by microprocessors or other analog or digital or hybrid techniques.

By storing the instantaneous characteristic values, comparing them with subsequent instantaneous values and feeding always the greater of these values into a store or register the maximum rate of the characteristic values which occur during a given measuring cycle can be detected.

It is also possible to predetermine a specific RPM and to merely display the characteristic values at such specific RPM.

As mentioned above, the information can be displayed by resorting to XY-plotters or oscilloscopes. Alternatively, the data can be stored on magnetic tapes, punched tapes, cards, discs or other information storing media.

The apparatus of FIG. 2 is especially useful for testing of engines whose RPM exceeds that of engines for road vehicles such as Otto-engines.

What we claim is:

1. A method of automatically ascertaining data denoting the torque, efficiency and/or power of an engine for a drive system in dynamic operation and in the original surrounding of the engine, comprising the steps of decoupling the engine from the drive system; generating first signals indicative of at least one of the parameters including the speed and the acceleration of the engine, said signal generating step including generating said first signals at a frequency which is proportional to instantaneous rotational speed of the engine and said signals constituting instantaneous values produced as a function of time during a predetermined interval of acceleration of the engine; multiplying said frequency and converting the resulting frequency into an electrical signal level; and converting said signal level into second signals indicative of the power, efficiency and/or torque of the engine.

2. A method as defined in claim 1, wherein said first signals are indicative of the speed of the engine and further comprising the step of differentiating said first signals whereby the differentiated first signals are indicative of the acceleration of the engine, said converting step including multiplying said first signals by said differentiated signals.

3. A method as defined in claim 1, wherein said speed is the angular velocity of the engine.

4. A method as defined in claim 1, further comprising the step of calibrating said second signals to denote the absolute values of power and/or torque of the engine.

5. A method as defined in claim 1, wherein the engine is an internal combustion engine having means for generating ignition pulses and said frequency is proportional to the frequency of said pulses.

6. A method as defined in claim 1, wherein said first signals are indicative of the speed of the engine and further comprising the steps of differentiating said multiplied first signals and multiplying said differentiated signals with a calibration constant so that the thus multiplied differentiated signals denote the absolute torque of the engine.

7. A method as defined in claim 6, wherein said converting step comprises multiplying said multiplied differentiated signals with said frequency-multiplied first signals whereby said second signals denote the power of said engine.

8. A method as defined in claim 1, wherein the engine is the internal combustion engine of a road vehicle, particularly an Otto engine.

9. A method as defined in claim 8, wherein the engine is normally coupled to a transmission of the road vehicle, and said first step includes decoupling the engine from the transmission.

10. A method of automatically ascertaining data denoting the torque, efficiency and/or power of an engine for a drive system in dynamic operation and in the original surrounding of the engine, comprising the steps of decoupling the engine from the drive system; generating first signals indicative of the speed of the engine, said first signals constituting instantaneous values produced as a function of time during a predetermined interval of acceleration of the engine; comparing said first signals with a reference signal denoting the maximum permissible speed of the engine; preventing further acceleration of the engine when said first signals match said reference signal; and converting said first signals into second signals indicative of the power, efficiency and/or torque of the engine.

11. Apparatus for automatic determination of data denoting the torque, efficiency and/or power of an engine for a drive system in dynamic operation and in the original surrounding of the engine, comprising means for monitoring the speed of the engine while the latter is decoupled from the drive system, said monitoring means having an output for transmission of first signals denoting said speed; a differentiating unit having an input connected with the output of said monitoring means and an output for differentiated first signals denoting the acceleration of the engine; and means for converting said first signals into second signals indicative of the torque, efficiency and/or power of the engine, said converting means including a multiplying unit having first and second inputs respectively connected to the outputs of said monitoring means and said differentiating unit and an output for said second signals.

12. Apparatus as defined in claim 11, wherein said monitoring means comprises a mechanical/electrical transducer.

13. Apparatus as defined in claim 11, wherein said speed is the angular velocity of the engine.

14. Apparatus as defined in claim 11, wherein said first signals are electrical alternating signals having a frequency which is indicative of the speed of the engine.

15. Apparatus as defined in claim 11, wherein said monitoring means includes pulse generating means with a pulse repetition frequency which is indicative of the speed of the engine.

16. Apparatus as defined in claim 15, further comprising means for generating direct voltage signals proportional to said pulse repetition frequency.

17. Apparatus as defined in claim 11, wherein said monitoring means comprises means for generating direct voltage signals.

18. Apparatus as defined in claim 11, wherein said first signals are electrical pulses and further comprising means for standardizing the amplitude and width of said pulses.

19. Apparatus for automatic determination of data denoting the torque, efficiency and/or power of an engine for a drive system in dynamic operation and in the original surrounding of the engine, comprising means for monitoring at least one of the parameters including the angular velocity and the acceleration of the engine while the latter is decoupled from the drive system, said monitoring means having an output for transmission of first signals denoting said one parameter and said monitoring means comprising a rotary perforated disc driven by the engine, an optoelectrical transducer cooperating with said disc to generate pulse signals having a repetition frequency proportional to the speed of said disc, means for standardizing the amplitude and width of said pulses including a Schmitt trigger and a monoflop circuit, and a low-pass filter for generating direct voltage signals proportional to the repetition frequency of said pulses, said direct voltage signals constituting said first signals; and means for converting said first signals into second signals indicative of the torque, efficiency and/or power of the engine.

20. Apparatus for automatic determination of data denoting the torque, efficiency and/or power of an engine for a drive system in dynamic operation and in the original surrounding of the engine, the engine including a power supply and means for producing signals at a frequency proportional to the instantaneous rotational speed of the engine, comprising means for monitoring the speed of the engine while the latter is decoupled from the drive system, said monitoring means including sensor means for detecting said electrical signals and said monitoring means having an output for transmission of first signals denoting said speed; means for connecting said power supply with said monitoring means; and means for converting said first signals into second signals indicative of the torque, efficiency and/or power of the engine.

21. Apparatus as defined in claim 20, wherein the engine is an internal combustion engine and the frequency of said electrical signals denotes the ignition pulse rate of said engine.

22. Apparatus as defined in claim 21, wherein said sensor means comprises a current transformer.

23. Apparatus for automatic determination of data denoting the torque and/or power of a drive system in dynamic operation and in the original surrounding of said system, said system including means for producing electrical signals at a frequency proportional to the instantaneous rotational speed of said system, comprising means for monitoring the speed of said system, said monitoring means comprising sensor means for detecting said electrical signals and frequency multiplier means having an input connected with said sensor means, said monitoring means having an output for transmission of first signals denoting said speed; means for converting said first signals into second signals denoting the acceleration of said system; and means for converting said first and second signals into third signals indicative of the torque and/or power of said system.

24. Apparatus as defined in claim 23, wherein said frequency multiplier means has a second input and further comprising a source of constant signals connected with said second input, said frequently multiplier means further having an output corresponding to said first mentioned output and each of said first signals representing the product of signals applied to said inputs.

25. Apparatus as defined in claim 23, wherein said frequency multiplier means has an output corresponding to said first mentioned output and further comprising a frequency-voltage converter connected between said output and said first mentioned converting means.

26. Apparatus as defined in claim 25, wherein said first mentioned converting means comprises a differentiating unit having a first input connected with said output and an output for said second signals, said last mentioned converting means including a multiplying unit having a first input connected with the output of said differentiating unit and a second input connected with the output of said frequency/voltage converter.

27. Apparatus for automatic determination of data denoting the torque and/or power of a drive system in dynamic operation and in the original surrounding of said system, said system including means for producing electrical signals at a frequency proportional to the instantaneous rotational speed of said system, comprising means for monitoring the speed of said system, said monitoring means comprising sensor means for detecting said electrical signals and having an output for transmission of first signals denoting said speed; means for converting said first signals into second signals denoting the acceleration of said system; comparator means having a first input for said first signals and a second input; means for applying to said second input reference signals denoting the maximum permissible speed of said drive system, said comparator means further having an output for additional signals denoting speeds exceeding said permissible speed; means for preventing the acceleration of said drive system in response to said additional signals; and means for converting said first and second signals into third signals indicative of the torque and/or power of said system.

28. A method of automatically ascertaining data denoting the torque, efficiency and/or power of an engine for a drive system, comprising the steps of generating first signals at a frequency which is proportional to instantaneous speed of the engine; multiplying said frequency; converting the resulting frequency into an electrical signal level; and converting said electrical signal level into a second signal indicative of the power, efficiency and/or torque of the engine.

29. A method as defined in claim 28, further comprising the steps of differentiating said multiplied first signals and multiplying said differentiated signals with a calibration constant so that the thus multipled differentiated signals denote the absolute torque of the engine.

30. A method as defined in claim 28, wherein said converting step comprises differentiating said frequency multiplied first signals and multiplying the differentiated first signals with said frequency multiplied signals whereby said second signals denote the power of the engine.

31. A method of automatically ascertaining data denoting the torque, efficiency and/or power of an engine for drive system, comprising the steps of generating first signals indicative of at least one of the parameters including the speed and the acceleration of the engine; converting said first signals into second signals indicative of the power, efficiency and/or torque of the engine; comparing said first signals with a reference signal denoting the maximum permissible speed of the engine; and preventing further acceleration of the engine when said first signals match said reference signal.

32. Apparatus for automatic determination of data denoting the torque, efficiency and/or power of an engine for a drive system, comprising a rotary perforated disc driven by the engine; an optoelectrical transducer cooperating with said disc to generate pulse signals having a repetition frequency proportional to the speed of said disc; means for standardizing the amplitude and width of said pulses and for generating direct voltage signals proportional to the repetition frequency of said pulses; and means for converting said direct voltage signals into second signals indicative of the torque, efficiency and/or power of the engine.

* * * * *